United States Patent [19]

Blagaila et al.

[11] 4,345,280
[45] Aug. 17, 1982

[54] ADDRESS MARK DETECTION CIRCUIT

[75] Inventors: John H. Blagaila, Boulder; James F. Hopper, Louisville, both of Colo.

[73] Assignee: Storage Technology Corporation, Louisville, Colo.

[21] Appl. No.: 183,936

[22] Filed: Sep. 4, 1980

[51] Int. Cl.³ .............................................. G11B 5/09
[52] U.S. Cl. ........................................ 360/49; 360/53
[58] Field of Search ...................... 360/48, 49, 39, 53; 371/36

[56] References Cited

U.S. PATENT DOCUMENTS 4,120,006  10/1978  Nagami et al. ......................... 360/49
4,189,756  2/1980   Ninomayi ............................... 360/49

Primary Examiner—Vincent P. Canney
Attorney, Agent, or Firm—Woodcock, Washburn, Kurtz, Mackiewicz & Norris

[57] ABSTRACT

An address mark detection circuit for use in a magnetic disk data storage unit is disclosed which features a Mealy sequential machine for providing a sequence of logical steps for the testing of sampled data in the search for an address mark; comparison between a given address mark and sampled data is eliminated. In a preferred embodiment, the specific mark to be detected is a first high frequency field followed by a second lower frequency field. The data is repeatedly sampled, and a digital frequency detector is used to provide a two bit signal to the sequential machine for stepping it in a direction corresponding to the frequency of the sample. The circuit allows elimination of means for detection of rotational position sensing information from a dedicated disk surface and elaborate phase-locked-loop circuitry for generating a data rate clocking signal in favor of simple and reliable logic circuitry.

10 Claims, 8 Drawing Figures

ADDRESS MARK DETECTION CIRCUIT

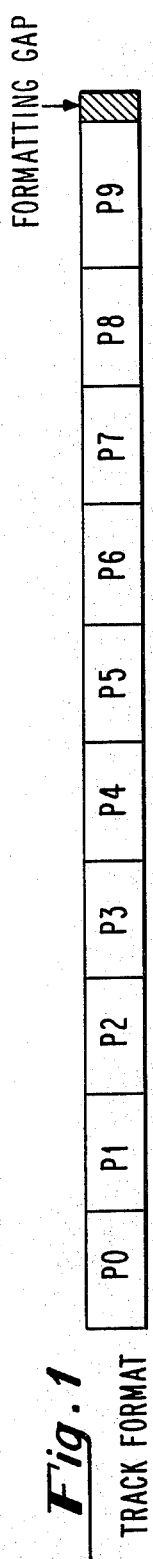
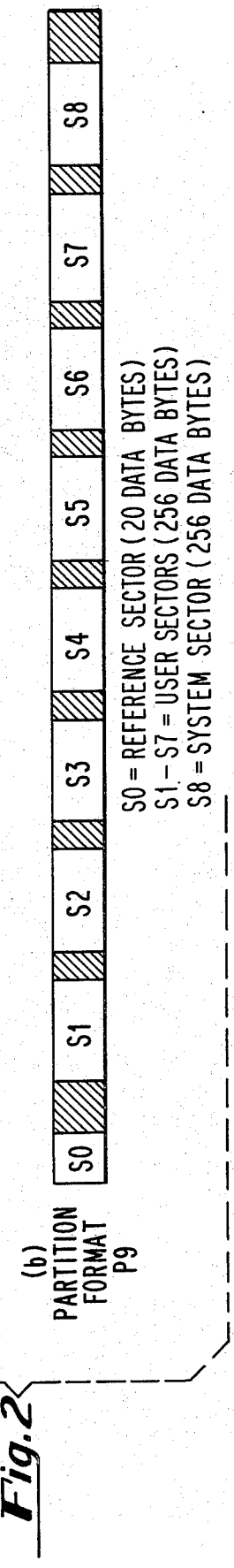
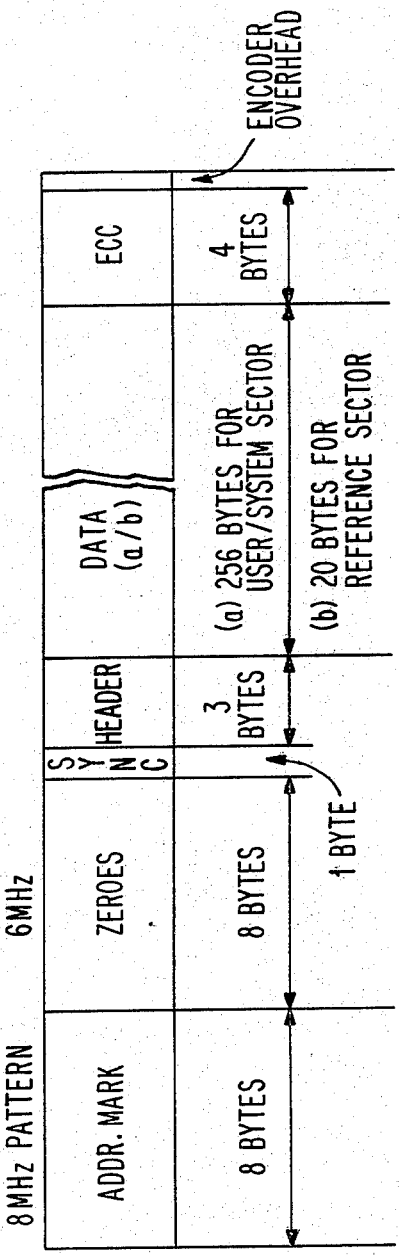

ADDRESS MARK DETECTION CIRCUIT BLOCK DIAGRAM

| PRESENT STATE | | | | | | FREQ B / FREQ A INPUT | | NEXT STATE | | | | | | AMDET2 / AMDET1 OUTPUT | |
|---|---|---|---|---|---|---|---|---|---|---|---|---|---|---|---|
| F | E | D | C | B | A | 9 | 8 | 7 | 6 | 5 | 4 | 3 | 2 | 1 | 0 |
| 0 | 1 | 0 | 0 | 1 | 0 | 0 | 0 | 0 | 1 | 0 | 0 | 1 | 0 | 0 | 0 |
| 0 | 1 | 0 | 0 | 1 | 0 | 0 | 1 | 0 | 1 | 0 | 0 | 1 | 1 | 1 | 0 |
| 0 | 1 | 0 | 0 | 1 | 0 | 1 | 0 | 0 | 1 | 0 | 0 | 0 | 1 | 0 | 0 |
| 0 | 1 | 0 | 0 | 1 | 0 | 1 | 1 | 0 | 1 | 0 | 0 | 0 | 1 | 0 | 0 |
| 0 | 1 | 0 | 0 | 1 | 1 | 0 | 0 | 0 | 1 | 0 | 0 | 1 | 1 | 1 | 1 |
| 0 | 1 | 0 | 0 | 1 | 1 | 0 | 1 | 0 | 1 | 0 | 0 | 1 | 1 | 1 | 1 |
| 0 | 1 | 0 | 0 | 1 | 1 | 1 | 0 | 0 | 1 | 0 | 1 | 0 | 0 | 1 | 1 |
| 0 | 1 | 0 | 0 | 1 | 1 | 1 | 1 | 0 | 1 | 0 | 0 | 1 | 1 | 1 | 1 |
| 0 | 1 | 1 | 0 | 0 | 0 | 0 | 0 | 1 | 0 | 0 | 0 | 0 | 0 | 1 | 0 |
| 0 | 1 | 1 | 0 | 0 | 0 | 0 | 1 | 1 | 0 | 0 | 0 | 0 | 0 | 1 | 0 |
| 0 | 1 | 1 | 0 | 0 | 0 | 1 | 0 | 0 | 1 | 1 | 0 | 0 | 1 | 1 | 0 |
| 0 | 1 | 1 | 0 | 0 | 0 | 1 | 1 | 1 | 0 | 0 | 0 | 0 | 0 | 1 | 0 |
| 0 | 1 | 1 | 0 | 0 | 1 | 0 | 0 | 1 | 0 | 0 | 0 | 0 | 1 | 1 | 0 |
| 0 | 1 | 1 | 0 | 0 | 1 | 0 | 1 | 1 | 0 | 0 | 0 | 0 | 1 | 1 | 0 |
| 0 | 1 | 1 | 0 | 0 | 1 | 1 | 0 | 0 | 1 | 1 | 0 | 1 | 0 | 0 | 0 |
| 0 | 1 | 1 | 0 | 0 | 1 | 1 | 1 | 1 | 0 | 0 | 0 | 0 | 1 | 1 | 0 |

MICROCODE EXAMPLE

*Fig. 6*

| COUNT | 8 | 4 | 2 | 1 | FREQ B | FREQ A | |
|---|---|---|---|---|---|---|---|
| | 0 | 0 | 0 | 0 | 0 | 0 | |
| | 0 | 0 | 0 | 1 | 0 | 0 | |
| | 0 | 0 | 1 | 0 | 0 | 0 | |
| | 0 | 0 | 1 | 1 | 0 | 0 | FREQ < 8.192 MHz (NOMINAL) |
| | 0 | 1 | 0 | 0 | 0 | 0 | |
| | 0 | 1 | 0 | 1 | 0 | 0 | |
| | 0 | 1 | 1 | 1 | 0 | 0 | |
| | 1 | 0 | 0 | 0 | 0 | 1 | |
| | 1 | 0 | 0 | 1 | 0 | 1 | FREQ = 8.192 MHz (NOMINAL) |
| | 1 | 0 | 1 | 0 | 0 | 1 | |
| | 1 | 0 | 1 | 1 | 1 | 0 | |
| | 1 | 1 | 0 | 0 | 1 | 0 | FREQ = 6.144 MHz (NOMINAL) |
| | 1 | 1 | 0 | 1 | 1 | 0 | |
| | 1 | 1 | 1 | 0 | 1 | 1 | FREQ > 6.144 MHz (NOMINAL) |
| | 1 | 1 | 1 | 1 | 1 | 1 | |

MULTIPLEXOR OPERATION

*Fig. 8*

ADDRESS MARK DETECTION CIRCUIT

FIELD OF THE INVENTION

This invention relates to the field of magnetic disk storage devices for the storage of digital data. More particularly, this invention relates to detection of encoded address marks for the separation of fields of data stored on magnetic disk storage media from one another, whereby the addressing information preceding the actual records may be clearly distinguished from the data to be stored, as well as from any other random data which may have been previously recorded on the disk storage media.

BACKGROUND OF THE INVENTION

It has been common practice for many years to store large quantities of digital data on magnetic disks. Typically these disks comprise plastic or metallic disks coated on both sides with a magnetic material. The magnetic material may be caused to take on either of two orientations by passing a current through a write head located in close proximity to the disk. A current will be induced in a read head when the thus encoded portion of the magnetic media passes under the head during a read operation. In this way data can be stored on a magnetic disk and recalled later for processing by a computer.

A common practice is to stack a plurality of such magnetic disks one above the other on a common axis, and to spin the stack continuously by a motor controlled to keep the rotational speed of the stack of disks constant. A plurality of read/write heads are juxtaposed closely to the surfaces of the disks and are driven radially in and out with respect to the disks by motors so that substantially the entire surface of the disk is available for storage. It is necessary in order that data can be reliably stored and retrieved from the magnetic disk storage media that it be possible to determine exactly where the read/write head is with respect to the disk, at any given time. Several different prior art approaches have been tried to this problem. The most popular approach currently, referred to as "rotational position sensing", is to provide one surface of the lowermost of the stack of disks with permanently encoded position information—that is, to provide a "dedicated" disk surface—from which a signal can be derived indicating both the radial position of the head with respect to the axis of the disks and also the relative rotational position of the disks with respect to the head. Given these two pieces of information, by accessing one of the plurality of read/write heads, any point on any disk can be written to or read from with accuracy. This approach has the additional advantage that the speed of the disk can be allowed to vary within relatively wide limits (for example, ±2%) since the detection of position information on a dedicated disk will automatically mean that the other heads of the array will be located over the same part of the other disks—that is, the position information is self-servoing. In order that the dedicated disk surface can contain rotational position information, the circuitry involved is further complicated. Complex means must additionally be provided to ensure proper timing of the read/write operations, which generally require elaborate phase-locked-loop circuitry for write frequency control, to ensure linear bit density independent of actual rotational speed.

Other possibilities for detection of an address mark on the disk surface to be read include the concept of writing a series of blanks ("DC erased areas") on the disk. Inasmuch as ordinarily the entire surface of a disk is written, this is suitable to generate an address mark. However, it is difficult to tell a purposely written blank from one induced by error or mischance as the low signal level can easily be confused with noise.

Another possibility is to encode a pattern of data which will not naturally occur in the storage of data during a write stage and "look at" successive segments of data for coincidence upon search for this address mark. This technique is used in floppy disk technologies. However, it poses a significant difficulty in that there are no patterns of data which could not conceivably occur within a data field; therefore, unless certain data patterns are to be forbidden, which is undesirable, the recording technique used for an address mark must be a violation of the recording "rules", which necessitates additional circuit complexity. Both the blank space and the floppy disk approaches may be characterized as searching for coincidence between a stored pattern and a sought-for pattern, and suffer due to errors in either the disk or the main memory where the compared data is stored.

A problem of particular gravity occurs with any recordation scheme involving address marks written onto the same disk as data (as opposed to a system in which the address marks are permanently coded on a dedicated disk surface), and more particularly in systems wherein the same disk surface is repeatedly written, read, and erased, as is increasingly the case in the use of disk drives as virtual storage systems to expand the main memory of computers. The problem is due to the fact that even if the disk is divided into areas of the same length for each storage operation, as is usual, the inevitable variation in speed between one writing operation and the next will mean that the amount of space taken up by a record written at a set bit frequency onto a disk will vary as the speed of the disk varies. Therefore, it is essential that some space be left between succeeding records written onto a given disk, so that writing of a first record does not inadvertently cause erasure of the next. However, this alone does not solve the problem because one can never be sure that all previous data has been erased, so that random data may occur between records. Accordingly, it is not always possible to define the start and end of a given record with precision, due to the presence of previously recorded data. Even more difficulty is caused by the fact that if two records are written onto the same area of a disk, the patterns may coact to produce an unpredictable data pattern which may conceivably be mistaken for a predetermined address mark being sought. These phenomena are referred to as "splash". It will be recognized by those skilled in the art that in order to provide a completely reliable address mark detection scheme, it must be assumed that "splash" is capable of producing any data pattern. However, one can assume safely that any given "splash" region has a maximum possible length, this length being defined by the amount of variation in rotational speed of the disk permitted, since the writing of new records of fixed length over old data can be presumed to erase all such old data. Hence, the possible location of splash is defined to be at the ends of new records.

A final point which must be considered in the design of any address mark detection scheme is that it cannot be permitted to fail upon the occurrence of drop-ins or drop-outs; that is, it must be infallible upon addition or deletion of at least some presumed worst-case number of data pulses from any predetermined address pattern, since this is to some degree inevitable with any magnetic data recording system.

OBJECT OF THE INVENTION

It is accordingly an object of the invention to provide a address mark generation and detection system which can reliably detect an address mark written on a magnetic disk.

It is a further object of the invention to provide an address mark detection circuit which can distinguish between an address mark and any worst case combination of previously and/or more recently recorded data.

It is a further object of the invention to provide an address mark detection circuit which can be readily and simply implemented in a fully digital circuit.

A further object of the invention is to provide a digital circuit for detection of address marks which is unaffected by worst-case amounts of drop-in and drop-out errors.

A further object of the invention is to provide an address mark detection scheme which is unaffected by substantial variation in the rotational speed of a magnetic disk stack within which it is used, but which does not require a dedicated disk surface containing rotational position sensing information for record location.

SUMMARY OF THE INVENTION

The above needs of the art and object of the invention are satisfied by the present invention which comprises a digital circuit for detection of a previously encoded address mark. In a preferred embodiment, the address mark comprises a first high frequency series of pulses followed by a second lower frequency series of pulses. When an address mark is sought for, data pulses from the disk are sampled. These pulses are processed to provide a signal indicative of their frequency to a digital circuit of the type known as a "Mealy Sequential Machine". This machine examines the pulse frequency information being supplied and goes through a series of logical decisions designed to determine whether or not the data pulses being examined are, in fact, an address mark or whether they are some combination of old and new data. After the address mark has been detected, the data read can simply be counted to provide a signal indicative of the end of the record. The sequential machine logic is such that it is relatively impervious to worst case drop-ins and drop-outs, and is moreover entirely digital, thus simplifying its manufacture and assembly and eliminating the need for calibration or temperature compensation. The dedicated disk surface thus need not be used for rotational position sensing, thus much simplifying the disk circuitry.

BRIEF DESCRIPTION OF THE DRAWINGS

The invention will be better understood if reference is made to the accompanying drawings, in which:

FIG. 1 represents a schematic depiction of the manner in which one track of one magnetic recording disk is divided into partitions;

FIGS. 2a and 2b show how the partitions are divided into sectors;

FIG. 3 shows how the sectors are subdivided into address marks, synchronizing bytes, headers, and data storage and error correction areas;

FIG. 6 is an example of a microcode which may be used to implement the Mealy sequential machine of FIG. 5;

FIG. 8 shows the operation of a multiplexor used in the hardware diagram of FIG. 7.

DESCRIPTION OF THE PREFERRED EMBODIMENTS

Figure 4:
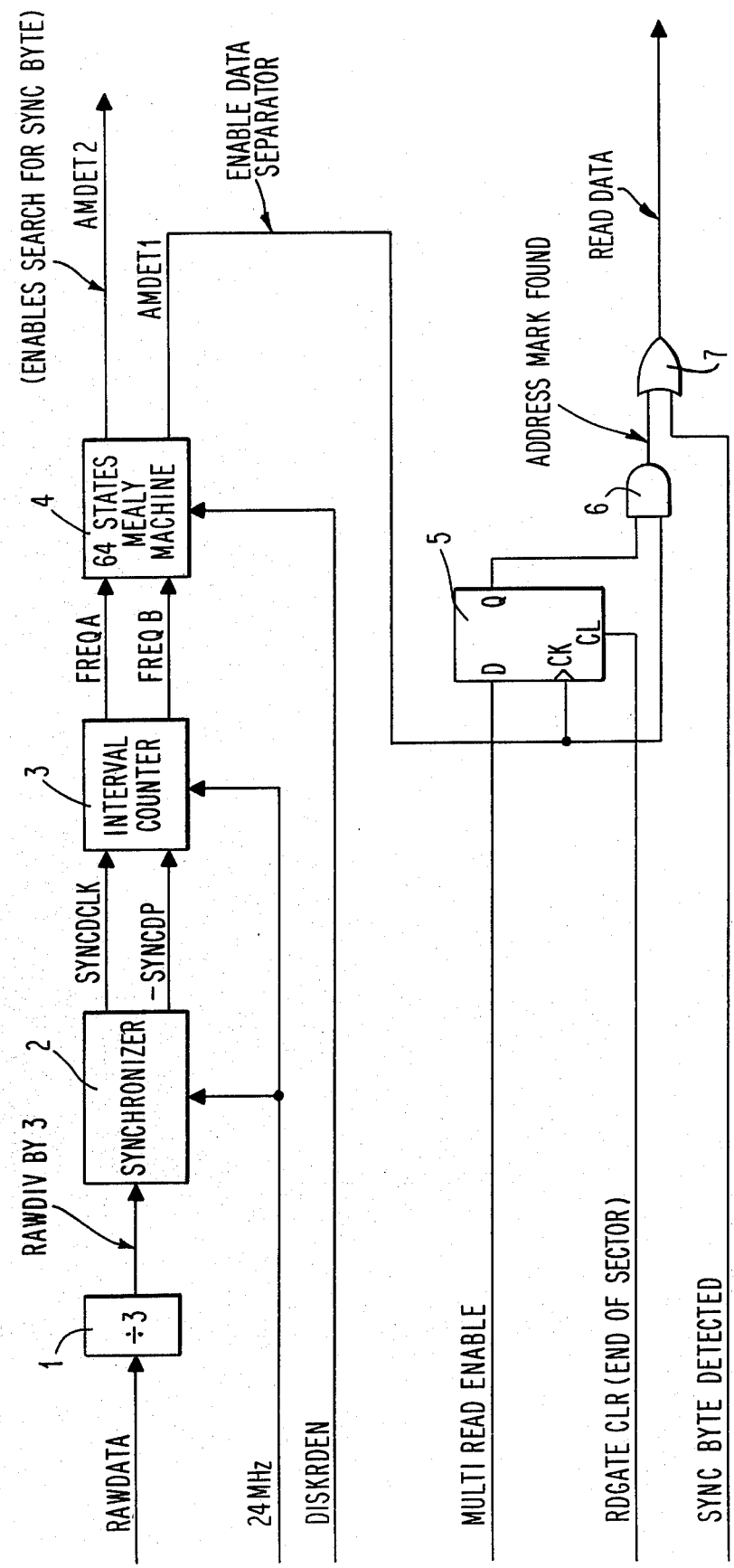
FIG. 4 is a block diagram of the address mark detection circuit.

As discussed above, the typical present-day magnetic disk storage system contains a plurality of disks rigidly mounted above one another on a common axis. The invention, however, may have applicability to single-disk systems, as well. A plurality of read/write heads, one for each side of each disk coated with magnetic recording material, are also commonly mounted for moving in and out together with respect to the axis of the disk. By controlling which of the read/write heads is energized, its distance from the center of the disk, and the rotational position of the disk with respect to the head, any given point on either coated surface of any disk can be accessed. In order to either read or write, therefore, the head being accessed, its distance from the axis of the disks, and the rotational position of the disk with respect to the head must be known. The present invention is concerned with the third of these pieces of information, and relates to a method for detecting address marks previously written onto a disk, whereby the rotational position of the disk with respect to the head can be precisely determined, without interaction of a dedicated surface and circuitry for rotational position sensing. While a dedicated disk surface may still be useful for provision of head position information, the economies realized by the elimination of phase-locked-loop rotational position sensing and data frequency clocking circuitry is substantial.

FIG. 1 shows the general way in which each individual track, i.e., each band of information storage area equidistant from the axis of a given disk, is laid out. It will be seen that the track is divided into ten regions, labeled $P_0$ through $P_9$, which are known as "partitions". Partitions $P_0$ through $P_8$ are of the same length; $P_9$ is slightly longer, for reasons discussed below. The remaining area on the track is taken up by a smaller area denominated "formatting gap" which amounts to tolerance in the length of the partitions required by speed variations in the disk.

As noted above, partitions $P_0$ through $P_8$ are identical. One of these is depicted in FIG. 2a. The partitions are divided into eight "sectors" $S_0$ through $S_7$. $S_0$ is a short "reference sector" having a length of 20 data bytes plus additional address mark area to be discussed below, while sectors $S_1$ through $S_7$ are "user sectors" comprising 256 data bytes with the same additional address mark area. It will be noted that the sectors are separated from one another by crosshatched regions. This area is unavailable to the user. That area following reference sectors $S_0$ is an area required for software overhead; that is, it represents a time during which the disk spins but data cannot be read or written therefrom because the software controlling the reading and writing of data requires time delay. The crosshatched area unavailable to the user following each of the user sectors $S_1$ through $S_7$ is the splash area referred to above; that is, variations in the speed of the disk cause variation in the length of the sectors, the splash being that area which, therefore, cannot be reliably written to or read from. The format of partition $P_9$, shown in FIG. 2b, is identical with the addition of an additional sector $S_8$, a "system sector". This is used as additional storage in case any of the sectors in any of the partions, that is any of the sectors $S_1$ through $S_7$ of partitions $P_0$ through $P_8$ and $S_1$ through $S_7$ of $P_9$ are defective for any reason. The system sector $S_8$ has, as noted, the same 256 byte length for data storage as the other system sectors.

FIG. 3 shows the format of each sector. As noted, it begins with an address mark, in a preferred embodiment equal to eight bytes, followed by eight bytes of zeroes which may also be considered part of the address mark. The eight bytes written as the address mark are written at 8 MHz, at the nominal speed of the disk, while the zeroes are written at 6 MHz. The significance of this pattern will be fully explained below. The address mark comprising the zeroes is then followed by a "sync byte" used to synchronize operation of the read circuit which does the actual reading, the address mark having been detected. This comprises one byte which may be written to be any desired pattern of data. The sync byte is followed by a header, three bytes long, which indicates which of the numerous records which can be stored on a given track has been located. The header is followed by the actual data area, which in the user and system sectors is 256 bytes long and is 20 bytes long in the reference sector forming the first sector of each partition, as noted above. Here is stored the actual "information" data the storage of which is the object of the magnetic storage system, as distinguished from the address marks, sync bytes and headers, used to control the storage system. The data storage section is followed by four bytes of error correction code (ECC) data which is used to ensure the probity of the data stored. Finally, half a byte may be provided for encoder overhead, again to allow a time delay for encoding operations to take place.

Accordingly, one track is divided into ten partitions, each of which comprises a plurality of sectors. Of these, seven sectors in each of nine partitions are useful for the storage of data while in a tenth partition, eight sectors are useful for data. Each sector comprises an address mark, a sync byte, and a header to enable appropriate reading and writing.

As mentioned above, according to a preferred embodiment of the invention the address mark comprises a high frequency signal followed by a comparatively lower frequency signal. Both are of specified lengths, and the total length is chosen to be longer than the maximum splash length possible. This fact is, of course, used in the detection of address marks and their differentiation from splash. Those skilled in the art will recognize that it is not enough to rule that any predetermined coded pattern longer than the maximum splash permitted by the speed tolerance of the drive can be considered to be an address mark, because it must be assumed that in the worst case condition any predetermined series of pulses may be destroyed by having additional pulses added or pulses dropped out. This makes comparison of segments of stored data with encoded data stored elsewhere unreliable, even granting that the problem of encoding address marks which cannot be counterfeited by any combination of legitimate data, splash, and mischance can be overcome. Furthermore, the desirability of providing a data storage system which does not require a dedicated servo track with rotational positional information and phase-locked-loop circuitry for generating a linear data frequency independent of the actual rotational speed of the disk, should be taken into account in the design of a circuit used in the detection of address marks.

Accordingly, the address mark detection circuitry of the invention is designed to ignore disk speed variations within a comparatively wide range of possible speeds, is substantially insensitive to drop-outs and drop-ins, and avoids comparison of sampled data with a stored address mark. When looking for an address mark the data stored on the disk is sampled to generate a signal indicative of whether the frequency of the data sampled is above a nominal high frequency value, within a range centered about the nominal high frequency, within a similar range centered on a nominal lower frequency signal, or below the nominal low frequency signal. The one of these four possibilities which is true for a given sample forms the logic input to a sequential machine which follows a predetermined logical sequence, stepping once per sample, so as to detect whether the high frequency field is followed by the low frequency field and whether the length of each falls within predetermined limits. At appropriate points in its operation, the sequential machine enables various circuitry connected with the actual reading and writing of data. Reference will now be made to FiG. 4 for a block diagram of the address mark detection circuit according to the invention.

FIG. 4 shows a signal "RAWDATA", i.e., the data being sampled, being supplied to the detection circuitry. If an address mark is, in fact, being sampled at the time it is being searched for, RAWDATA will comprise a first high frequency series of pulses followed by a comparatively low frequency series of pulses. This signal is first divided in a divide-by-3 unit 1 so as to provide an output signal less dependent on the speed of the disk; that is, any variations in the spacing of the pulses on the disk will be averaged by a factor of three. This data, referred to as "RAWDIV BY 3", is then passed to a synchronizer 2. The other input to the synchronizer 2 is a 24 MHz clock signal. The output of the synchronizer 2 is a series of pulses the spacing of which is dependent upon the average frequency of the raw data pulses. The 24 MHz clock signal is also supplied to an interval counter 3, which counts the number of clock pulses occurring between synchronized RAWDIV BY 3 pulses. The output of the interval counter is a two bit binary signal, referred to as "FREQ A" and "FREQ B". Together these signals indicate the frequency of the data sampled. They are the inputs to a 64-state Mealy sequential machine 4 which, as discussed in further detail below, follows a predetermined logical sequence of steps in accordance with the inputs, FREQ A and FREQ B, which correspond to the frequency of the data sampled to control the machine. When a first state in the operation of the Mealy machine 4 is reached, a signal referred to as "AMDET 1" is output, upon determination that the data being tested appears to be an address mark. This signal is used to enable the data separator circuit via OR gate 7. In a later stage in operation of the sequential machine 4, a second signal "AMDET 2" is output. This enables the search for the synchronizing byte. If the sync byte is then detected, a "SYNC BYTE DETECTED" signal is supplied to OR gate 7 thus holding the data separator circuit on. In accordance with the sector diagram of FIG. 3 the header is then examined to determine whether the particular sector being read is that sought by the host computer; if so, the data following is read into memory. Additional signals input to the block diagram of FIG. 4 are "DISKRDEN", used to turn on the Mealy machine 4 when an address mark is to be sought for, "MULTI-READ ENABLE" used to control a flip-flop 5 latching the circuit via an AND gate 6 in the data separator enabled mode; and "RDGATECLR", used to clear flip-flop 5 when the end of the sector has been reached. It will be noted, therefore, from the block diagram that the Mealy machine 4 operates in response to two bit binary input signal FREQ A and FREQ B indicative of the frequency of the incoming signal. In accordance with these inputs it follows a predetermined sequence of logical steps to control enablement of the data separator and sync byte search circuits.

Figure 5:
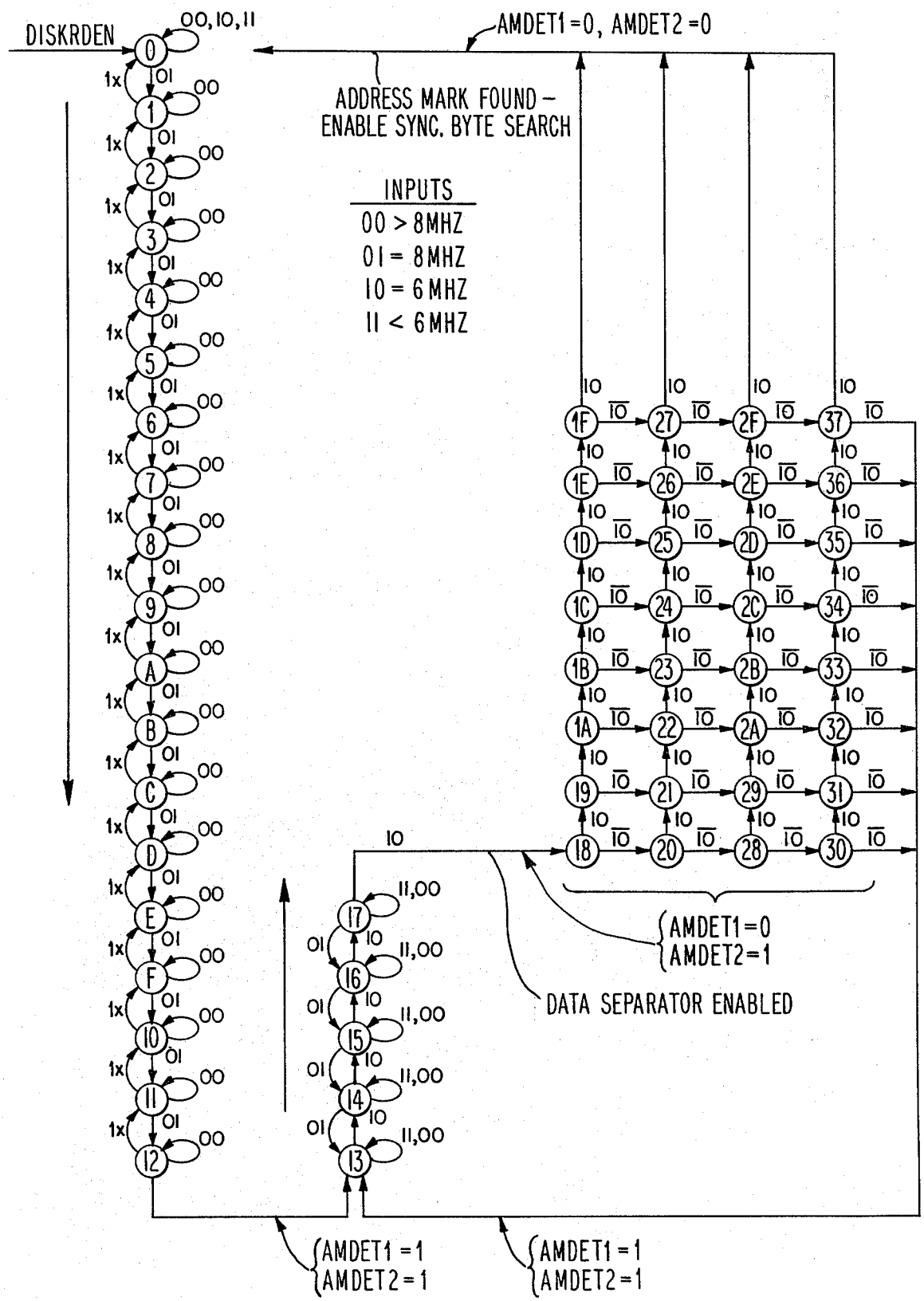
FIG. 5 is a state diagram of the Mealy sequential machine.

FIG. 5 shows the state diagram of the Mealy sequential machine 4. This diagram is used to represent the response of the machine under given input conditions. Each of the numbers shown in circles represents a "node" or decision making point. The arrows leading from one node back to itself or to a different node indicate the decision made in response to the input listed next to that arrow. For example, looking at the node numbered 3 (in the column at the left side of FIG. 5) if the input is 00 no change in the state of the machine will occur, as the arrow is pointing back at the node 3—that is, the machine will remain at node 3. If the input is 01, the machine will step to node 4. If the input is 1X, that is, 1 followed by either 0 or 1, a retrograde step to node 2 will be undertaken. The inputs, as listed in the table in the center of the diagram, are representative of the frequency of the raw data sample. 00 indicates that the frequency of the samle is greater than 8 MHz; 01 indicates that the sample frequency is 8 MHz; 10 that it is 6 MHz; and 11, that the sample frequency is less than 6 MHz.

It will be understood by those skilled in the art that the 01 and 10 inputs, indicative of the 8 MHz or 6 MHz data frequencies respectively, in fact, refer to nominal frequencies; since the data is not self-servoing, the actual high and low frequencies of the address mark can vary within certain limits, defined by the speed variance of the disk. The ranges resulting in the inputs mentioned are defined by a multiplexor discussed in further detail in connection with FIGS. 7 and 8 below.

The frequency of "information" data written or read to the disk drive in which the preferred embodiment of the invention is designed to be used is either 3, 4 or 6 MHz, depending on the data. Accordingly, it will be appreciated that the comparatively low frequency "zeroes" portion of the address mark is equal to the maximum data rate. This is the reason why it is referred to as "zeroes" and not necessarily as part of the address mark. Nevertheless, to the extent that the Mealy machine operates on the "zeroes" data, it can be considered as an important part of the address mark according to the invention.

Referring again to FIG. 5, when the disk read enable signal DISKRDEN is passed to node 0, the machine begins to operate. As noted, it moves to node 1 only if the input is 01, that is, if the input signal is 8 MHz, as if the beginning of the high frequency portion of the address mark field had been detected. As long as the input frequency, which is sampled at regular intervals, continues to be 8 MHz, the machine steps from nodes 0 through 12; it is noted that the nodes are numbered in hexadecimal and that node 12 is actually the nineteenth node. The responses to the inputs made at nodes 1–12 are as described above. If the input is 00, indicating that the frequency is greater than about 8 MHz, no change in state of the machine is undergone. If the input is 01, indicating that the data frequency is about 8 MHz, the next state is reached. If the input is 10, indicating that the data frequency is 6 MHz, or is 11, less than 6 MHz, the machine reverts to the previous state. Thus, if 19 samples are tested and each indicate that 8 MHz data is being read to the machine, it eventually reaches node 13, at the bottom of the diagram shown in FIG. 5. The spacing of the data on the disk is such that an error-free address mark will comprise sufficient high-frequency data for approximately 25 measurements. This permits some errors of both the drop-in and drop-out types without affecting operation of the circuit.

Nodes 13 through 17 are looking for signals at the 6 MHz frequency. Accordingly, the machine steps to the next node when the input is 10, indicating that the data frequency is 6 MHz. Where the input is 01, indicating an 8 MHz frequency, it reverts to the previous node, except in the case of node 13, where it stays in place. In the case of either an 11 input, indicating that the data measurement indicates a data rate of less than 6 MHz, or 00 (greater than 8 MHz) the machine's state remains unchanged. After node 17 the data separator is enabled, as noted, by outputing the AMDET 1=0 signal. The next region of the Mealy sequential machine amounts to a safety valve for final determination that an address mark has been detected. The data separator is enabled before this time in order to allow it to lock on the incoming data. The next group of nodes, numbered 18–37, are a rectangular array rather than a line of decision points. This is to allow additional possibility of drop-ins and dropouts without destroying detection of the address mark. In each case, if the input is 10, again indicating a 6 MHz frequency determination, the machine steps to the next node. If it is anything other than 10 (indicated as $\overline{10}$) the machine detours rightward in the path. Three lines of nodes are provided, allowing the possibility of three drop-ins or drop-outs within this region of the sequential machine's operation. If more than three such "detours" are undergone, the machine returns to the beginning of the search for the zero field area of the machine at node 13; AMDET 1 is reset to 1. Finally, if any of the nodes 1F, 27, 2F or 37 are reached, and a final 10 input is received, the machine then enables the search for the synchronizing byte by setting AMDET 2=0, having determined that an address mark has been found.

Thus, when the search for the address mark is initiated, the time between succeeding pulses on the disk is measured and converted to a frequency indication. So long as the data being sampled is actual information data, the signal supplied to the Mealy machine will be such as to cause it to remain in node 0. When the first signal is received indicating that the frequency of about 8 MHz has been detected, the machine will step to step 1, and so on. If the input pulses continue to be of this frequency, the Mealy machine will eventually reach the end of the first series of nodes and will then begin to look for the 6 MHz data samples in order to conclude the address mark detection operation.

It will be appreciated that the Mealy machine as described provides a logical sequence of instructions for responding to binary inputs representative of the frequency of the input data. If the machine finds itself in a splash pattern it will, of course, be highly unlikely to provide data pulses in the proper sequence. Moreover, the maximum length of the splash area on any disk may be calculated and the number of steps in the Mealy machine be set to exceed the number of possible steps provided by such a random data pattern.

FIG. 6 shows an example of a microcode which can be used to implement the sequential machine. Such a microcode will be stored in a read-only memory (ROM) in well-known fashion and used to control status changes of latches controlling the operation of the other circuitry associated with the read/write apparatus by controlling the AMDET 1 and 2 signals.

In FIG. 6 there are shown four sets of instructions, each corresponding to one of the nodes of FIG. 5. Those of nodes 12, 13, 18, and 19 are shown. Each set of instructions comprises four 16-bit binary numbers. The first six bits represent the present state of the machine, that is specify the address of the node. Thus, the six bits (F–A) on the left of each of the four lines corresponding to node 12 are the hexadecimal number 12 expressed in binary. The next two bits, numbered 9 and 8, respectively, refer to the inputs to the system and vary from line to line—that is, they are the four possible combinations of FREQ A and FREQ B which specify the frequency of the data being sampled during the search for an address mark. The "next state", specified in bits 7 through 2, is the address of that node to which the machine will step upon receipt of the input on that line. Finally, bits 1 and 0 on each line refer to the state of the two signals AMDET 2 and AMDET 1 which are output by the microcode in response to the state specified in bits 7–2 having been reached. For example, at the last node of either of the line sequences 0–12 or 13–17 shown in the Mealy machine state diagram of FIG. 5, or the end of the array shown, there is a change in AMDET 2, AMDET 1, or both, so as to control the data separating circuit and the sync bit search circuit, respectively. Thus, for example, looking at the microcode for node 12, one sees that if, for example, the input is 11, indicating that the frequency of the input data is less than 6 MHz, the next state is that address specified preceding node 12, node 11; that is, the next state specified in bits 7–2 on the fourth line of the microcode for node 12 is the binary equivalent of the hexadecimal number 11. On the other hand, if the input to node 12 is 01, indicating that a input signal is 8 MHz, the next state, specified on the second line, is node 13. In this case, of course, as can be seen from FIG. 5, node 13 is the first of the nodes during which the 6 MHz signal is to be detected, so that the machine will now step to the next node 14 only upon detection of a 10 input indicating a 6 MHz data rate. Therefore, bits 7–2 on the third line of the microcode for node 13 indicate the binary version of the hexadecimal number 14. However, as noted in bits 1 and 0, the output portion of microcode for node 13, AMDET 2 and AMDET 1 stay the same, regardless of the input to node 13, since in no case will either the sync bit search or the data separator circuits be enabled upon exit from node 13. As noted, upon stepping from node 12 to node 13, both are set to 1. The microcodes for nodes 18 and 19 are similar; in both cases, only upon receipt of a 10 input will the sequential machine be stepped to the next node. In all other cases—that is, upon receipt of a 10 signal—the machine will step rightwards on the diagram, as this input means that the sampled data signal is not of the 6 MHz frequency being sought for during this portion of the sequential machine's operation.

Figure 7:
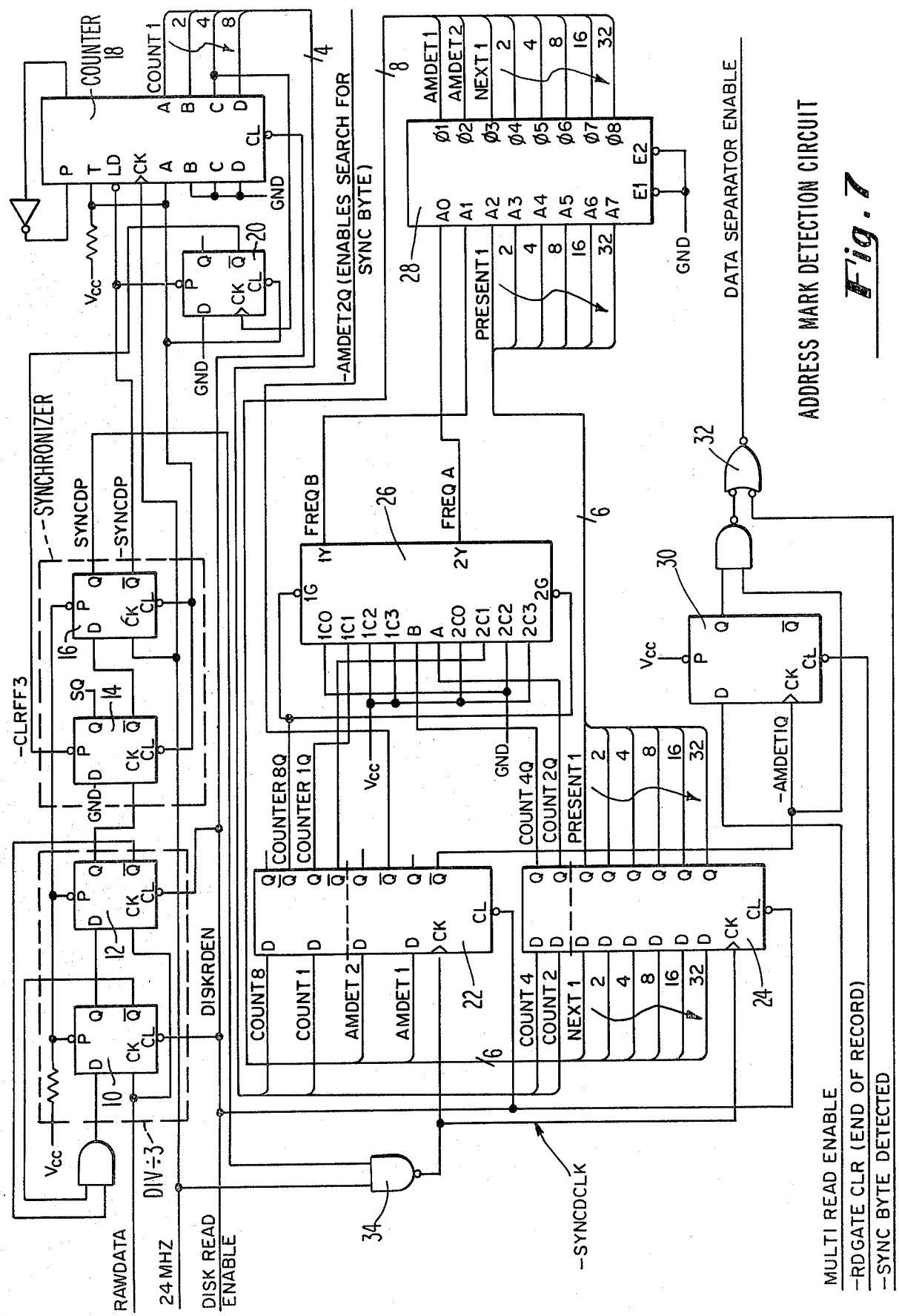
FIG. 7 is the schematic diagram of the hardware used to implement the Mealy sequential machine, as well as the other elements of the address mark circuit.

FIG. 7 shows a detailed hardware embodiment of the address mark detection circuit shown in block diagram in FIG. 4. The RAWDATA signal is passed to a pair of flip-flops 10 and 12 which together comprise the divide-by-3 circuit. The Q output of flip-flop 12 is passed to a second pair of flip-flops 14 and 16 which together make up a synchronizer circuit. The second of these flip-flops 16 is clocked by the 24 MHz clock signal; the synchronized output is a regular series of pulses, the frequency of which is measured by a counter 18. The counter 18 outputs a four line output which is passed to a pair of registers 22 and 24. The first and fourth bits of the output of counter 18, COUNT 1 and COUNT 8, are passed to a first register 22 and bits 2 and 3, COUNT 2 and COUNT 4 are passed to the second of the registers 24. A fifth flip-flop 20 is also incorporated in the circuit to limit its high speed response to reduce noise interference.

Thus, upon enabling of the circuit by a DISK READ ENABLE signal passed to the flip-flops 10 and 12 and to the counter 18, the circuit begins to measure the interval of time between the outputs of the divide-by-3 circuit by counting 24 MHz clock pulses. The four bit output of the counter 18 is passed to the two registers 22 and 24 and is stored therein. It is then converted into a two bit binary signal, FREQ B and FREQ A in a multiplexor 26. As discussed above, if the sample frequency is indicated as being below 6 MHz, FREQ B FREQ A is 11, if at or about 6 MHz, 10, if at or about 8 MHz, 01, and if above 8 MHz, 00. The operation of multiplexor 26 will be discussed in further detail below. FREQ B and FREQ A are then passed to a ROM 28 within which is stored the complete microcode of which FIG. 6 is an example. In accordance with its inputs, FREQ B and FREQ A, the ROM 28 is accessed, using as additional inputs the six-bit present state address PRESENT 1–32, equivalent to bits F–A of the microcode of FIG. 6. In accordance with the microcode of FIG. 6, stored in FOM 28, the "next state address" (bits 7–2 of the microcode) indicating the state to which the Mealy machine is to be stepped in response to the inputs FREQ B and FREQ A, is output as NEXT 1–32. AMDET 1 and AMDET 2 are likewise output by ROM 28. The next state address is stored in a portion of register 24 not used to store the COUNT output; upon clocking of the register 24 by the DISK READ ENABLE signal the next state address becomes the present state address and is again applied to the input of ROM 28, and the process is repeated. Similarly, the outputs AMDET 1 and AMDET 2 of ROM 28 are stored in that portion of register 22 not used to store bits of the COUNT signal; in order to deglitch this signal, AMDET 1 is output from register 22 via a latch 30, and is used to enable operation of the data separator, confirmed upon detection of the sync byte, via an OR gate 32. AMDET 2 is output by ROM 28 to register 22 to means for enabling the search for the sync byte. Upon receipt of a RDGATECLR signal, indicating that the end of the record has been read, latch 30 is cleared which causes the data separator circuit to be shut off. As noted above in connection with the block diagram of FIG. 4, the data separator circuit is thus enabled prior to actual reading of data since there is some time delay required to lock on the incoming data stream.

The operation of the registers 22 and 24 and the multiplexor 26 which together comprise the interval counter 3 noted on the block diagram of FIG. 4 are clocked by the combination in an AND-gate 34 of the 24 MHz clock signal and the output of the synchronizer circuit. The registers 22 and 24 are interposed between the input and output sides of the ROM 28 to deglitch its operation, as is well-known in the art. Accordingly, the ROM 28 amounts to the Mealy machine 4 of the block diagram of FIG. 4. The binary inputs FREQ A and FREQ B to the Mealy machine are defined by the multiplexor 26 to be indicative of the input sample frequency while the outputs of the Mealy machine are simple logic level signals AMDET 2 and AMDET 1 enabling the search for the sync bit, which indicates the actual start of the record, and the data separator circuit which actually reads the data from the magnetic disk, respectively.

The operation of the multiplexor 28 will now be described with respect to FIG. 8. As noted, the function of the multiplexor is to output a binary signal, FREQ B and FREQ A, corresponding to the frequency of the input signal. What is done is that the input signal is divided by three, and synchronized by combination with a 24 MHz clock signal to output a regular stream of pulses. The interval between the divide-by-3 input pulses is counted by a counter 18 which steps once upon each 24 MHz pulse. Thus, the number of counts between outputs of the synchronizer is indicative of the frequency of the input pulses. The output of the counter 18 is on four lines labeled COUNT 1–8, which are latched in registers 22 and 24 and presented to the multiplexor 26. The COUNT signals are indicated in FIG. 8 as the four columns on the left notated 8 through 1, and are those signals contained on the four bit bus connecting the counter 18 with the registers 22 and 24. Thus, if the data on the four bit bus is 0111 or less, indicating that no more than seven clock pulses have been counted in the interval between inputs from the synchronizer, the frequency is greater than 8.192 MHz; therefore, FREQ B and FREQ A are both set to 0, and the input to the Mealy machine for that sample is 00. If the count is 1000, 1001 or 1010, the frequency is within a range centered about 8.192 MHz nominal frequency; that is, the high frequency portion of the address mark may have been detected. Accordingly, FREQ B and FREQ A is 01. If the output of the counter is 1011, 1100 or 1101, the sample frequency is in a band centered about 6.144 MHz and accordingly, the low frequency signal 10 is passed to the ROM 28. Finally, if the count is 1110 or 1111 (or greater) this is a signal that the frequency is less than 6.144 MHz and accordingly, the input to the ROM is 11. It will be appreciated by those skilled in the art that in this way the high and low frequencies being converted into binary inputs to the ROM 28 by the multiplexor 26 are not confined to actual frequencies, but need only be centered in a band around some nominal frequency; this allows for variance in the speed of the disk and for sampling error. Moreover, a simple crystal clock of extreme accuracy can then be used, as it need only be roughly compared with the sampled pulses to yield a meaningful output.

It will be appreciated that there has been described a digital circuit for the detection of an address mark comprising a high frequency field followed by a correspondingly lower frequency field. The use of the Mealy sequential machine as the logic of the detection circuit means that drop-ins and drop-outs can be tolerated to a considerable degree without affecting the accuracy of detection, since the logical sequence of steps will be simply be delayed by improper pulses. Moreover, it will be appreciated that while the relatively simple digital embodiment of the invention both allows it to be easily and simply implemented, as its digital circuitry requires no calibration or adjustment, and allows use of the Mealy sequential machine, programmable in microcode so that that the details of the program can readily be changed to reflect any desired operating conditions, many of the same advantages would be obtained with analog circuitry. For example, an integrator stage could be enabled upon detection that a particular sample was of the frequency sought for; when the integrated sum reached a given threshold, it could be concluded that a high frequency field of a predetermined length had been detected. A similar integrator could be used to detect the low frequency field. In either case, drop-ins or drop-outs would not necessarily invalidate the conclusion reached. However, it is believed preferable to use the digital embodiment of the invention as it requires no calibration or compensation, as well as being easier to reprogram in the event of a change in desired address mark specifications.

It will be appreciated that the use of a digital address mark detection circuit, designed to require the following of a long series of logical steps in order before an "address mark detected" signal can be given, means that it is most unlikely to be given in error. Moreover, even if the address mark were not longer than the maximum splash area, which might be necessitated, for example, by permitting larger manufacturing tolerances in the speed of the machine thus causing larger splash areas, the address mark would still be reliably detected simply on the basis of the statistical unlikelihood of the logical sequence being followed by random data. The provision of the address mark circuit of the invention, which provides detection of address marks without rotational position sensing circuitry, allows significant economies due to elimination of phase-locked-loop data read and write frequency clocking. While it is important to efficient operation of the machine that the splash area be as confined as possible by better disk speed control, it is not necessary that the precise location of the disk with respect to the head be known, since this can be detected instantaneously by the circuitry according to the invention. Therefore, expensive and elaborate phase-locked loop circuitry designed to "detect" the exact position of the disk from dedicated rotational position sensing data and "remember" it by counting phase-locked-loop clock pulses for a time until a particular point on the disk surface is juxtaposed to the head, can be eliminated. This allows simplification, resulting in improved reliability as well as substantial savings in machine cost.

However, it will be appreciated that perhaps the most significant advantage provided by the present invention is the elimination of comparison between an address mark recorded on disk and one supplied by a host computer when the search for a particular sector is initiated. The difficulty with the comparison approach, as noted above, is that defects in recording in either the disk or in the main memory can cause failure of the comparison to occur. This situation is, of course, possible in any memory system, not merely those where variations in disk speed can cause overlap of data recorded at differing times, thus causing splash. Instead, the method of the invention calls for performing a sequence of tests on all sample data and concluding that that data which passes all the tests is, in fact, an address mark. Since there is no one-to-one comparison between a stored address mark and a supplied address mark, there is no necessity that the stored address mark be any particular address mark; it need only pass the test. In this way, a certain quantity of drop-ins and drop-outs can be tolerated without destruction of the utility of the address mark. Moreover, if a sufficient number of individual tests are provided in a sequence such that the data must be of a very specific nature in order to reach the end of the sequence of tests, the likelihood that any random data pattern generated by splash or by other error may be detected as an address mark can be rendered practically infinitesimal. Where, as in the preferred embodiment, the address mark can conveniently be made longer than any possible splash, the possibility of detecting a splash area as an address mark can be reduced to zero..

Finally, it will be appreciated that while a detailed description of the invention has been provided, this is but one of numerous possible embodiments of the invention; various refinements and improvements can be made to the circuit of the invention without departing from its essential spirit and scope. In particular, the circuit of the invention is useful with types of magnetic data storage other than disk media, such as tape storage. Therefore, the invention is not to be measured by the above disclosure which is exemplary only but rather by the scope of the following claims.

We claim:

1. An address mark detection circuit for detection of an address mark recorded on a magnetic data storage means, said mark comprising a series of pulses of predetermined length and predetermined frequency comprising:
   means for measuring the frequency of pulses recorded on said storage means;
   means for measuring the duration of series of pulses measured to be at said predetermined frequency;
   means for comparing the measured duration of said series with said predetermined length; and
   means for indicating detection of an address mark in response to an indication by said means for comparing that the measured duration of said detected series of pulses of said predetermined frequency is at least equal to said predetermined length.

2. The circuit of claim 1 wherein said means for comparing the measured duration of series of pulses measured to be at said predetermined frequency comprises means for performing a sequence of logic steps, wherein said sequence is advanced upon detection of pulses of said predetermined frequency by said means for measuring the frequency of pulses recorded on said storage means.

3. The circuit of claim 1 wherein said means for measuring the frequency of pulses recorded on said storage means comprises clock means for supplying a series of clock pulses to counter means for counting the number of clock pulses supplied between ones of said pulses recorded on said storage means.

4. The circuit of claim 3 wherein the output of said counter means is supplied to multiplexor means for conversion into a binary signal indicative of the frequency of said pulses recorded on said storage means, said binary signal being applied for control of said means for comparing the measured duration of series of pulses measured to be of said predetermined frequency with said predetermined length.

5. The circuit of any one of claims 1-4 wherein said address mark comprises a plurality of said series of pulses of predetermined frequency.

6. Method of locating address mark data stored together with random data in a magnetic data storage means, comprising the steps of:
   sampling data stored in said storage means;
   performing a predetermined sequence of test operations on said sampled data, said test operations being such as to differentiate between said address mark and said random data, and to permit completion of said sequence by sampled data containing no more than a predetermined fraction of misrecorded data; and
   indicating the detection of an address mark upon completion of said sequence of test operations by said sampled data;
   whereby detection of an address mark may be achieved without direct comparison between said sampled data and data supplied upon initiation of a search for an address mark.

7. The method of claim 6 wherein said steps of sampling data stored in said storage means and performing a predetermined sequence of operations on said sampled data comprise the steps of:
   repeatedly analyzing said sampled data to determine its frequency;
   comparing the determined frequency to a range of frequencies; and
   upon each such comparison, performing the next one of said sequence of test operations if said comparison indicates that the frequency of said sampled data is within said predetermined range of frequencies.

8. The method of claim 7 wherein plural ranges of frequencies are provided in a predetermined sequence.

9. Apparatus for the detection of address mark data stored in magnetic storage media, comprising:
   means for sampling data;
   means for performing a sequence of varying examination operations on successive samples of said data, where performing of the entire sequence is indicative of detection of an address mark, and where steps are taken along said sequence only when said examination indicates that the sampled data is in accord with predetermined characteristics.

10. The apparatus of claim 9 wherein said sampling means comprises means for measuring the frequency of sampled data and means for comparing said frequency with a predetermined range of frequencies.

* * * * *